R. L. WILCOX.
ASSEMBLING MACHINE.
APPLICATION FILED MAY 9, 1916.

1,286,467.

Patented Dec. 3, 1918.
8 SHEETS—SHEET 1.

Witness
Chas. L. Griesbauer.
Florence H. Monk.

Inventor
Richard Lester Wilcox
By George E. Hay
Attorney

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

ASSEMBLING-MACHINE.

1,286,467.  Specification of Letters Patent.  Patented Dec. 3, 1918.

Application filed May 9, 1916. Serial No. 96,368.

*To all whom it may concern:*

Be it known that I, RICHARD LESTER WILCOX, a citizen of the United States, residing at Waterbury, in the county of New Haven and State of Connecticut, have invented certain new and useful Improvements in Assembling-Machines, of which the following is a specification, reference being had therein to the accompanying drawings.

My invention relates to a new and improved assembling machine, referring more particularly to a machine for automatically grouping a plurality of elements at predetermined relative periods so as to produce a unitary structure composed entirely of such several elements.

It is the object of my invention, among other things, to produce a device of this character wherein the several elements may be fed automatically from a hopper to several feeding stations, having means for automatically stopping the operation of the mechanism if perchance any one of the elements is not properly presented; a transfer mechanism that will positively insure the feeding of only one element at a time, a hopper mechanism for automatically feeding blanks with the heavier end uppermost, and such other and further improvements as will produce a machine for the purpose described, that may be constructed at the minimum cost and with such few parts that they may be readily assembled and when so assembled will operate with the minimum amount of care and attention.

To these, and other ends, my invention consists in the bullet assembling machine, having certain details of construction and combinations of parts as will be hereinafter described and more particularly pointed out in the claims.

Referring to the drawings, in which like numerals of reference designate like parts in the several figures;

Fig. 8 is an enlarged fragmentary view of the feed mechanism;

Fig. 9 is an enlarged view of the lower portion of the gate and the several punches connected therewith;

Fig. 10 is an enlarged view of the bolster plate and the die mechanisms;

Fig. 11 is a group view of the several elements showing the various steps in the operation of the machine and an enlarged end view of the finished product;

Fig. 12 is an enlarged plan view of the transfer mechanism;

Figs. 13, 14 and 15 are the escapement devices;

Figs. 16 and 17 are elevation and side views respectively of one of the hopper mechanisms;

My invention is illustrated herein as applied to a machine for assembling bullets, but is not limited to this type of machine, as it is adapted to be used equally as well with machines for assembling numerous other articles.

The finished bullet described herein is composed of a jacket, a pyramid and a slug. The jacket, in the form of a cup, is first fed into the machine and then by drawing operations is formed so as to have a conical point, after which the pyramid is inserted therein with the pointed end down, and then the slug.

The outer edges of the end of the jacket are then turned inwardly to prevent the dislodgment of the slug or pyramid and pressure is applied to positively form a single, unitary structure. A star, or other indicating mark, is then pressed on the end of the slug and the article is ejected as a finished product. All of these successive operations are automatic, the jackets, pyramids and slugs being first thrown indiscriminately into separate hoppers and then conveyed one at a time to the assembling devices. If any one of these several elements should not feed properly, one at a time, the machine will automatically stop, thus insuring the perfection of the product and eliminating all possibility of injury to any of the operative parts of the machine.

The invention has been so designed that it is readily connected with a power press of any standard type, thus enabling the device to be constructed at the minimum cost.

The numeral 1 designates the frame of the machine, 2 the legs upon which it is mounted, and in which is rotatable a crank shaft 3, which operates a reciprocating gate 4 through the connections 5. All of these parts are old in the art and operate in a well known manner.

The crank shaft is rotated through a pulley 6 mounted upon a shaft 7 journaled in the bracket 8, and having a pinion 9 thereon, the teeth of which mesh into those of a gear 10 rotatable upon the shaft 3, and prevented from moving endwise by a collar 11. A clutch mechanism of the usual type is provided to form a separable engagement between said crank shaft and said gear 10, said mechanism comprising a key 12, having a longitudinal movement in a groove 13 in the collar 14 upon the shaft 3, a clutch lever 15 pivotally secured by the bolt 16 to the bracket 25 fixed to the frame by the bolt 26, and the outer end 17 of which is in the path of the notch 18 in said key.

The clutch lever 15 is connected with the hand lever 19 pivotally secured to the frame upon the stud 20 through a spring pin 21 connected by the pintle 22 with said lever and surrounded by a spring 23 which bears at one end against a head 24 of said pin and at the other end against the bracket 25, and a link 27 connected with the lever 19 and the pin 21. As the handle end of the lever 19 is movable downwardly, the clutch lever 15 is moved upon its pivot mounting and the outer end 17 thereof is moved out of the path of the key 12 and the spring 28 in said key, which abuts against the fixed pin 29, moves said key so that the outer end thereof enters one of a plurality of radial notches 30 in the hub of the gear 10 and thereby provides a medium whereby there is a fixed and rigid connection between said hub and crank shaft and the said crank shaft will be caused to be rotated thereby. When in its down position the hand lever 19, which is so fitted as to have a slight lateral movement, is prevented from moving upwardly by reason of an engagement with a lip 31, upon the outer end of a plug 32, fixed in the frame 1. As soon as the lever 19 is disengaged from the lip 31, the spring 23 moves the clutch lever 15 upwardly and it then lies in an annular groove 33 in the collar 14 and the outer end 17 thereof is in the path of the notch 18, and by reason thereof the key 12 is given a movement parallel to the axis of the crank shaft 3 and its outer end withdrawn from the radial notch 30, with which it has been engaged, thus severing the connection between the gear 10 and crank shaft 3 and permitting the gear to rotate freely upon the crank shaft 3 without imparting movement thereto. It is obvious that at this time all of the mechanism except the gear 10 and its driving mechanism will come to a full stop.

The clutch mechanism, above described, with the exception of the hand lever 19, constitutes no part of the present invention, as the same can now be purchased in the open market and are more or less in common use.

Fixed to the lower horizontal portion of the frame 1, by the bolts 35, is a bolster 34, within which is mounted a plurality of die holders 36, having the dies 37 therein. These die holders are held against movement in one direction by the backing block 38, secured to the bolster 34 and in the opposite direction by the caps 39 fixed to the front of the bolster by the bolts 40. The dies 37 are cylindrical in form and provided with shoulders 41 near their upper end to prevent an upward movement within the die holders.

Within the bolster, beneath each of the dies, is a hardened plate 42, to support the dies and to take the shock and wear which would otherwise be transmitted to the bolster itself. The vertical section of each of the dies is different, as shown in Fig. 10, its shape depending upon the operation to be performed by it.

Movably mounted in the bolster plate, between the lugs 43, is the slide 44, having therein a plurality of spring fingers 45 that are pivotally connected at one end to said slide in the sockets 46, and having semicircular grooves in their inner faces near their outer ends, which combine to form a receiving opening 47. Springs 48 that lie between the fingers 45 and a portion of the slide 44, exert a pressure so as to move the fingers inwardly. These fingers are mounted in the slide so that the space between the openings 47 is the same as that between the openings in the dies 37, so that at each movement of the slide the fingers travel from one die to the other and at the next movement return to their original position and continue this step by step movement during the entire operation of the machine.

Journaled in the brackets 52 and 53 is the vertical shaft 49, which is rotated from the crank shaft 3 through the miter gears 50 and 51.

Movable within the bracket 53 is a slide 54 which is operatively connected with the slide 44 so as to impart its movement thereto, both as to direction and length of stroke. This movement is derived from the shaft 49 through the cam 55 fixed thereon, which engages rolls 56 secured to the slide 54.

These slides, and the means for connecting and operating them are not new in the art, and therefore are not shown and described in greater detail.

Fixed to the upper portion of the frame 1 are the hoppers 57, 58 and 59, the hopper 58 being provided for the jackets 60 (see Fig. 10), the hopper 57 for the pyramids 61, and the hopper 59 for the slugs 62, and leading from these several hoppers are the conductor tubes 63, 64 and 65, which are supported at their lower ends by the standards 66, 67 and 68, which are fixed to the slide brackets 69 and 70 which in turn are adjustably secured to the backing block 38.

The hopper 58 is of a type well known in the art, and therefore, will not be described in detail in this application, the jackets being delivered therefrom into the conductor tube 63 so as to be presented to the punches and dies in substantially the same relative position as shown in Fig. 10.

As the pyramids 61 are to be delivered with their point end down, and therefore the heavier end upward, a special form of hopper mechanism has been designed to perform this work, consisting essentially of the hopper 57, a chute member 71 connected therewith and supported at its lower end upon a cross bar 72 that is secured upon a bracket 73 fixed to the frame 1. Journaled in the chute member 71 is the shaft 74, having a beveled gear 75 thereon which is driven from the beveled pinion 76 fixed on the shaft 77, mounted in the chute member 71 and rotated by means hereinafter described.

Fixed to the outer end of the shaft 74 is a spider 78, to which is fixed the disk 79 by the rods 80. This disk is provided with a plurality of openings 81 therethrough substantially the same shape, but slightly larger than the pyramids 61.

During the rotation of the disk it contacts with the upper face of a cylindrical portion 82 of the chute member 71, and forming part thereof is a segmental discharge block 83, in which is a groove 84 of substantially the same width as the greatest diameter of the pyramid 61, and varying in depth from the entrance end, designated by the numerals 85, to a depth at its opposite discharge end, designated by the numerals 86, substantially the same as the largest diameter of the pyramid.

A semi-circular shield 87 is loosely mounted upon the shaft 74 and rests upon the disk 79 so as to form a pocket, in which the pyramids assemble as they are delivered from the chute member 71 out of the hopper 57.

Figure 1:
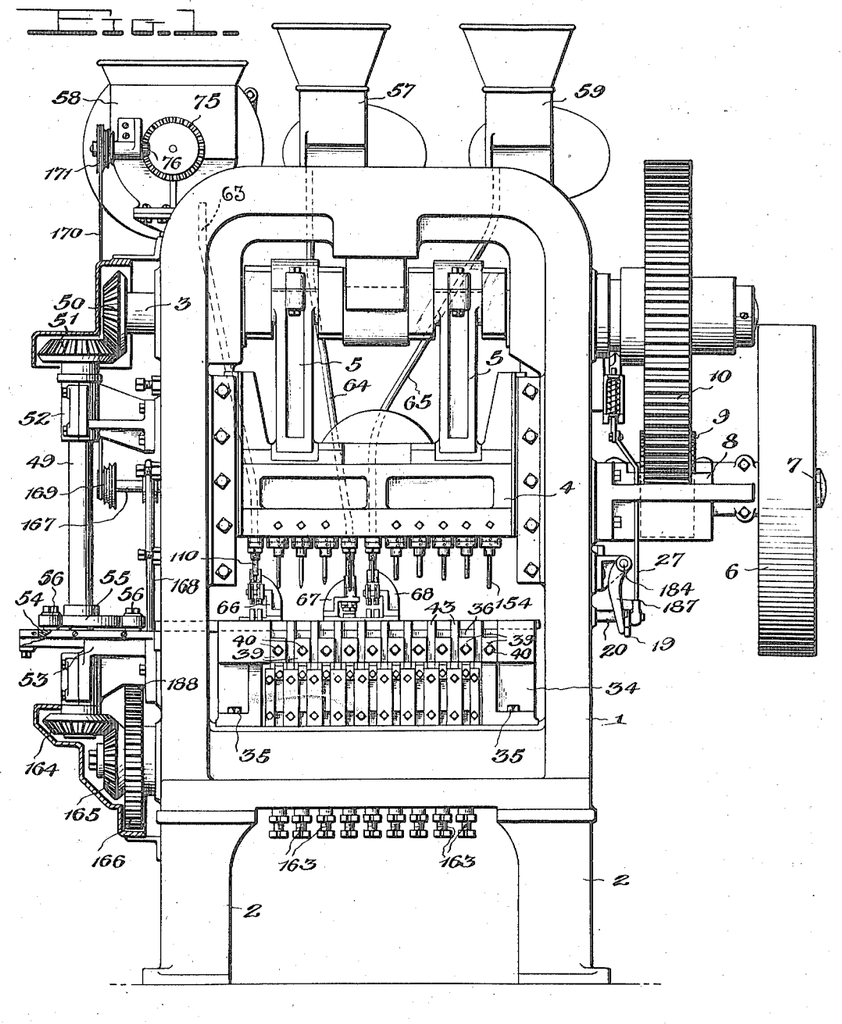
Figure 1 is a front view of my improved machine complete.
Figures 2, 3, 4:
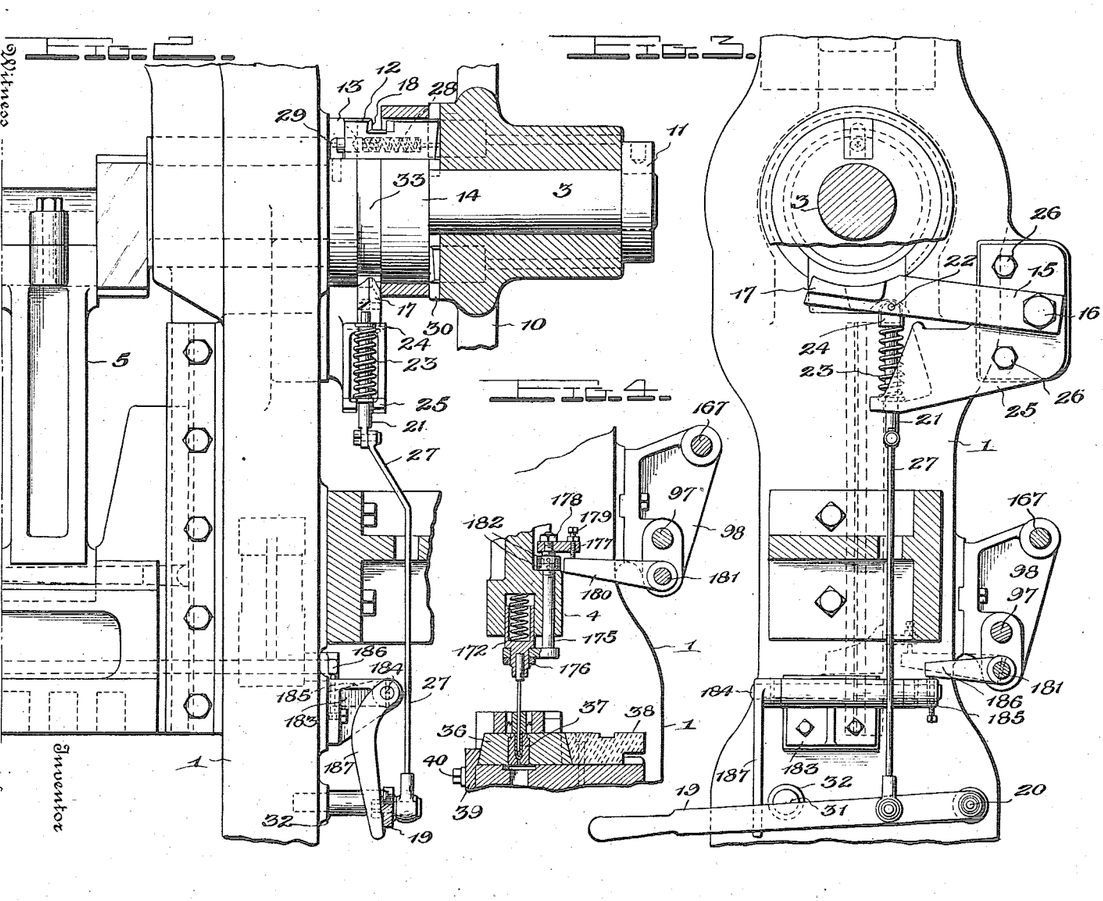
Fig. 2 is an enlarged fragmentary elevation of a portion thereof.
Fig. 3 is a side view of the parts shown in Fig. 2, partly in section.
Fig. 4 is a sectional elevation of some of the parts, taken substantially upon the line 4—4 of Figs. 9 and 10.
Figures 5, 6:
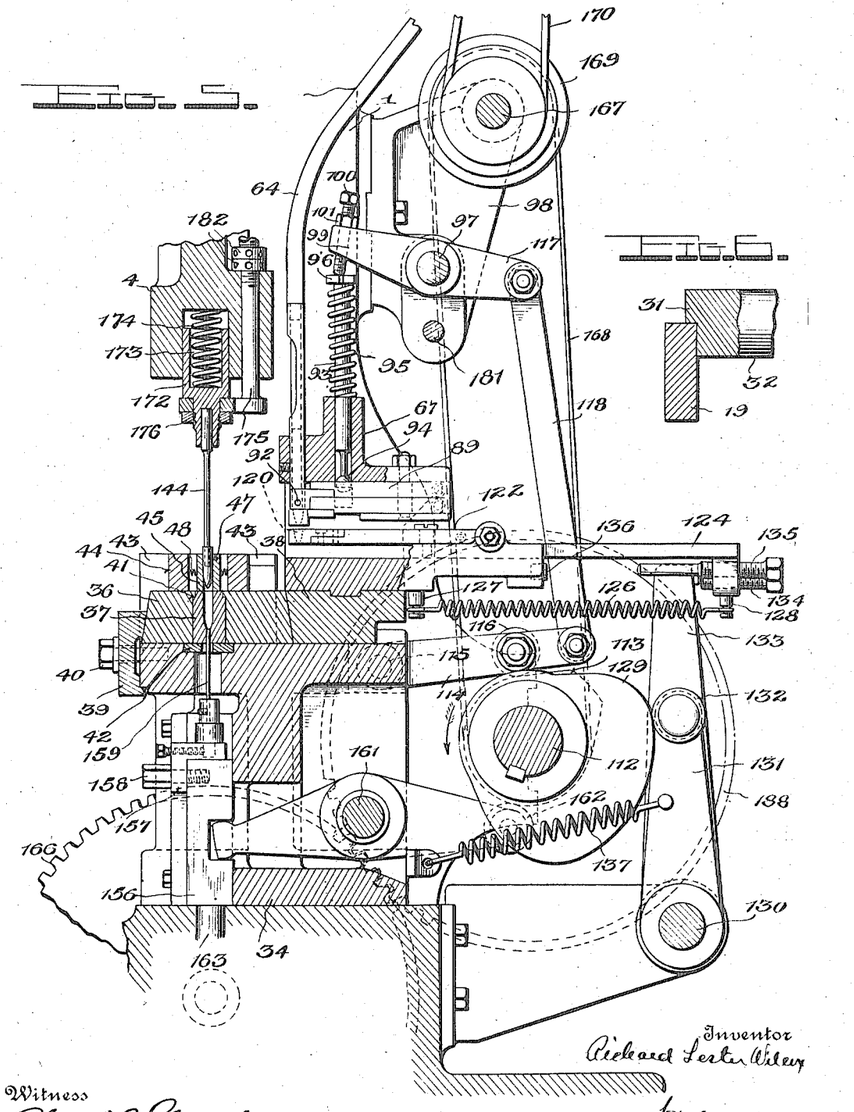
Fig. 5 is an enlarged sectional view of the same and additional parts, taken substantially upon the same line as Fig. 4.
Fig. 6 is an enlarged fragmentary view of the trip lever and plug.
Figures 7, 18, 19:
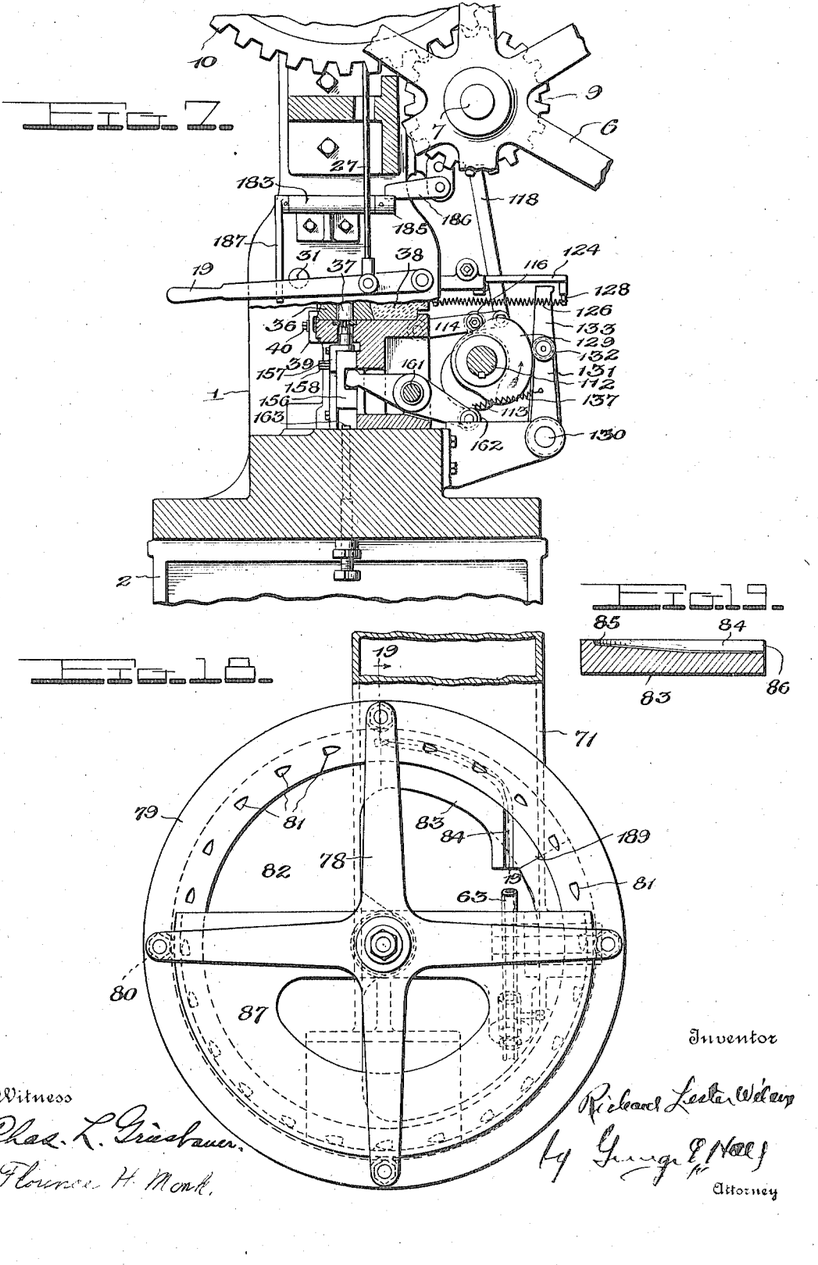
Fig. 7 is a fragmentary side elevation of the lower portion of the frame of the machine and adjacent parts.
Fig. 18 is a plan view of a portion thereof.
Fig. 19 is an enlarged sectional view of the segment plate, taken upon line 19—19 of Fig. 18.
Figure 17:
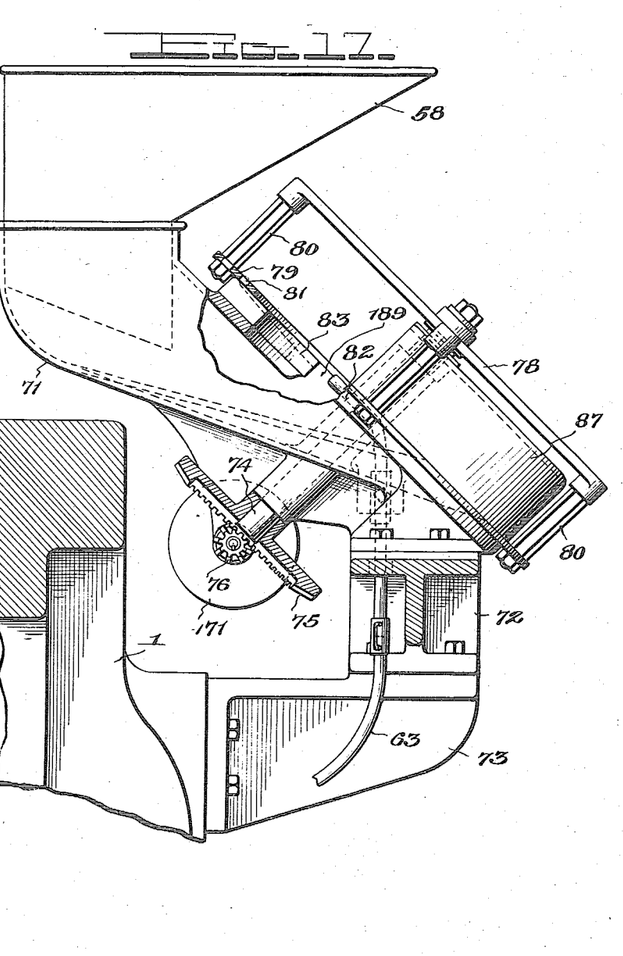
Figure 18:
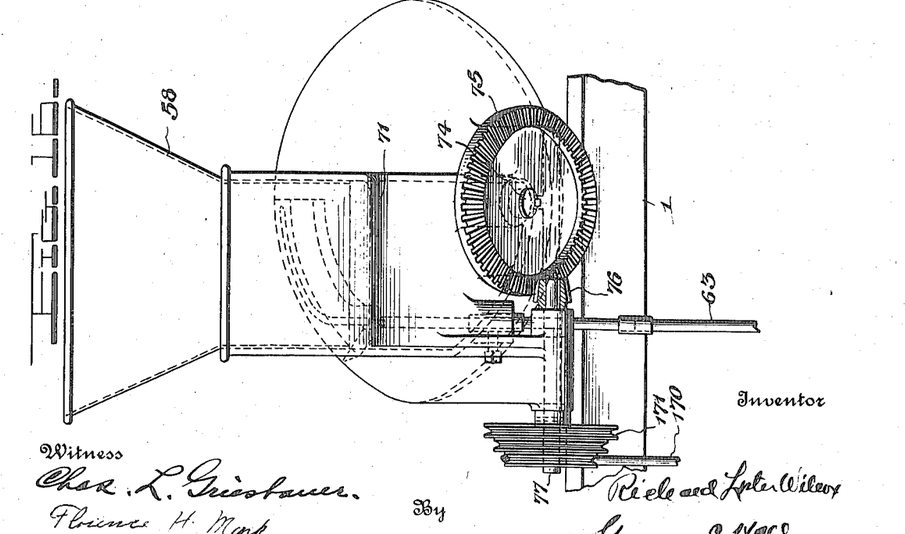

As the openings 81 in the disk 79 pass under the mass of pyramids lying within the shield 87 they are successively filled by the pyramids dropping therein by gravity. These pyramids are then carried with said disk until the openings 81 successively register with the end 85 of the groove 84 in the segmental discharge block 83, at which time they begin to drop by gravity from the disk 79 into this groove, which gradually increases in depth and thereby permits the said pyramid to pass entirely through the opening in said disk and lie entirely within said groove. As soon as released from the disk the pyramids travel by gravity action through the groove in a path at substantially a right angle to the path at the time the groove first receives the pyramid (Fig. 18), and with their pointed ends down, drop into the upper end of the conductor tube 64 and are then conveyed, as above described, to the standard 67. There is an open space 189 between the face of the discharge block 83 and the upper end of the conductor tube 63, so that if the conductor tube is filled the blanks drop back into the hopper to be taken therefrom, as before described. This overflow or spillway feature insures a continuous flow of blanks, and at the same time prevents clogging of the parts, or the use of complicated mechanism to relieve the overflow, as has been common heretofore. After the jacket, pyramid and slug have arrived at the lower end of the conductor tubes they are transferred therefrom, one at a time, to a point where they are in line with the punches.

The mechanism for transferring the jacket from the conductor tube to the punch comprises a pair of companion tongs, which are pivotally connected to the standard 66 by the pins 88, the upper of said tongs being designated by the numerals 89 and the lower by the numerals 90, between the rear ends of which are the springs 91, which normally exert their tension so as to move said tongs upon their pivot mounting and cause the inner ends having the stop pins 92 therein to move toward each other. These tongs are moved upon their pivot mountings against the tension of the spring 91 so as to move the pins 92 away from each other by the plunger 93, which is slidably mounted in the standard 66 and provided with a ball 94 upon its lower end, a coil spring 95 surrounding the shank thereof, and a collar 96 upon its opposite end. As the plunger 93 moves downwardly, the ball 94 thereon passes from the upper tongs 89 to the lower tongs 90, thereby permitting the upper tongs to close through the action of the spring 91 and the lower tongs to open. The movement of the plunger 93 in the opposite direction produces the reverse action upon the lower and upper tongs. This plunger is moved downwardly through the action of a rock shaft 97 that is journaled in the brackets 98 fixed to the frame 1, a rock arm 99 fixed to said shaft, having a screw 100 therein which engages the upper end of said plunger. It is apparent that the extent and timing of the movement of the plunger 93 may be varied by the change of the position of the screw 100 within the rock arm 99, a jam nut 101 being provided to lock the screw in any of its adjusted positions.

Mounted in the slide bracket 69, so as to move in a path at substantially a right angle to the slide 44 is a transverse slide 102, upon which the tongs 103 are pivotally mounted through the screws 104; a spring 105 between two arms of the tongs exerts its tension so as to move the opposite ends of said tongs toward each other; a stop 106, fixed in the slide, limits the inward position of one of said tongs so that the pockets 107 in the outer ends thereof are directly below the conductor tube 63, and when in this position a lug 108 engages the point of a screw 109 threaded in the bracket 69 and holds the tongs so that they are not entirely closed when in this rearmost position.

In operation the jacket passes down through the conductor tube and is discharged from the lower end thereof with the bottom of the jacket resting upon the pins 92 in the lower tongs 90, the plunger 93 then moves downwardly permitting the upper tongs 89 to close and the pins therein to pass under the next upper jacket in the column, at the same time opening the lower tongs 90, so that the pins 92 therein pass from under the jacket, which then drops by gravity into the pocket 107 in the tongs 103. The slide 102 then moves forward until the pocket 107 registers with the punch 110 and the opening 47 in the first pair of spring fingers 45, after which the gate moves downwardly and the tip 111 of the punch 110 enters the jacket and forces it out of the tongs 103 and into the die beneath it.

During the upward movement of the gate, the slide 102 is withdrawn and the above described operations are repeated.

As the vertical distance between the pins 92 in the upper and lower tongs is substantially the same as the length of the jacket, it is apparent that only one jacket can escape from the conductor tube at a time, the pins 92 in the lower tongs forming a rest for the bottom jacket in the column, and when they move away from each other the pins 92 in the upper pair of tongs prevents the escape of another jacket until the tongs 90 are again moved together, and the pins 92 therein form a stop for the next jacket.

As soon as the forward movement of the slide 102 begins, the lug 108 passes beyond the point of the fixed screw 109 and the spring 105 moves one of the arms of the tongs 103 so as to grip the jacket. It is apparent that the pocket 107 is therefore slightly larger in diameter when the jacket drops therein than after the forward movement of the slide begins.

The means for rocking the shaft 97 comprises a shaft 112, upon which is fixed a cam 113; a rock lever 114 pivotally connected by the pintle 115 to the bolster 34; a roll 116 fixed to said lever 114, and having contact with the periphery of the cam 113; a rock arm 117 fixed to the rock shaft 97; and a link 118 connecting said rock lever 114 and said rock arm 117.

The cam 113 is fixed on said shaft so that the downward movement of the plunger 93 will take place just before the slide 102 begins to move forward.

Both the pyramids 61 and slugs 62 are delivered into the openings 119 and 120 of the tongs 121 and 122, respectively, in substantially the same manner as described for the jackets, and the slides 123 and 124 move forward in substantially the same manner as the slide 102. As the pyramids are not of uniform diameter it is necessary therefore that the shape of the jaws of the lower tong should be modified. This has been done as shown in Fig. 14, wherein the numerals 125 designate the solid jaws instead of pins 92, as before described. The slides 102 are moved inwardly by a spring 126, one end of which is connected with a fixed stud 127 and the other end to a stud 128 in the slide. They are moved outwardly by a cam 129 fixed on the shaft 112, through a rock arm 131 fixed on the shaft 130, and having a roll 132 fixed thereon, which engages the periphery of said cam, and is kept in contact therewith by a spring 137. Another rock arm 133, fixed to said shaft 130, contacts at its upper end with a screw 134 threaded in said slide. This screw provides a simple and convenient means for varying the relative position of the slide so as to bring the pockets or openings 107, 119 and 120 in register with the discharge end of the conductor tubes. The inward position of said slides is adjustably limited by screws 135, the inner ends of which abut against a hardened button 136 fixed in the slide bracket. This screw also provides means for insuring the positive alinement of the said pockets or openings with the center of the punches when in their innermost positions.

In operation, the jacket is first delivered to the first pair of fingers in the slide 44. It is then transferred to the first die in said fingers and the punch 138 engages it, forces it through the fingers into the die and draws the lower end thereof so that it assumes the shape, a section of which is designated by the numerals 139 of Fig. 10. As the punch 138 moves upwardly the jacket is knocked out of the die by knockout mechanism, hereinafter described, and into an opening 47 in one of the pairs of spring fingers 45 in the slide 44 which are then in line therewith. It is transferred in said fingers in line with the next die, and the punch 140 forms it into the shape designated by the numerals 141 in Fig. 10. It is then knocked out of the die and transferred to the next die and the punch 142 forms the jacket into the shape designated by the numerals 143 in Fig. 10. The jacket is then transferred to the next die, at which time a pyramid 61 is inserted by the punch 144, the parts in their then relative position being designated by the numerals 145, in Fig. 10. The jacket, containing the pyramid, is then transferred to the next die in the series and a slug is delivered to the jacket above the pyramid and the punch 146 forces it into the jacket. It is then transferred to the next die in the series and the punch 147 engages the end of the slug and by its pressure upon the end thereof forces the same farther into the jacket and the pyramid into the end of the same. The jacket with its containing members is then transferred to the next die and the punch 148 partially closes the outer end of the jacket, as appears from the numeral 149, in Fig. 10. The three elements as a unit are then transferred to the next die and the punch 150 entirely closes the end of said jacket, said closed end being designated by the numerals 151 in Fig. 10. The members are then transferred to the next die and the punch 152 forms an indicating or trade device upon the end thereof, such as the star 153, shown in Fig. 11, thus completing the bullet, which is then transferred to the next die and the punch 154 forces the same out of the fingers 45 through the opening 155 in said die and it then drops into a receptacle conveniently arranged to receive it.

The knockout mechanism comprises a plurality of knockout slides 156, which are movably mounted in the bolster 34, to the top of each of which is fixed a holder 157 by the screw 158, and in which is secured the knockout pins 159. The knockout slides 156 are given a vertical movement by reason of the rock levers 160, which are mounted upon the shaft 161 and are actuated from the cam 113 through a roll 162. The downward position of the slides 156 is determined by the stop pins 163 that are threaded through the frame 1. The shaft 112 derives its rotary movement from the shaft 49 through the miter gears 164 and 165 and spur gear 166, the teeth of which mesh into and drive the pinion 188 on said shaft. Shaft 167 is rotated from the shaft 112 by a belt 168 and the shaft 77 by a belt 170 connecting the cone pulley 169 with the cone pulley 171.

The punches 138, 140, 142, 147, 148, 150, 152 and 154 are rigidly secured to the gate 4 in a manner well known to the art, but the punches 110, 144 and 146 have a yielding connection. This connection comprises a sleeve 172, within which the punch is secured, slidably mounted in the gate, having a pocket 173 therein, containing a coil spring 174, which exerts its tension so as to normally move the sleeve 172 downwardly.

Trip rods 175, slidably mounted in the gate 4, are secured to the sleeves 172 by the nuts 176. To the upper ends of the trip rods 175 are secured the trip plates 177 by means of the nuts 178, and threaded through said trip plates 177 are the screws 179, the ends of which are in the path of the trip arms 180 fixed to the rock shaft 181 journaled in the brackets 98. The downward movement of the trip rods 175 is limited by the jamb nuts 182.

Journaled in the bracket 183, fixed to the frame, is a rock shaft 184, having on one end a trip arm 185 in the path of movement of the rock arm 186, and on the other end a trip arm 187, which normally lies against one face of the hand lever 19. The relation of all of these parts is such that as the shaft 181 is caused to rock by means hereinafter described, the trip arm 186, engages the trip arm 185 and rocks the shaft 184 and the arm 187 imparts a slight lateral movement to the hand lever 19 and disengages the same from the lip 31 on the plug 32, at which time the spring 23 moves the clutch lever 15 upwardly and stops the rotation of the mechanism, in the manner before described.

Shaft 181 will only rotate when actuated by the screws 179 coming in contact with any one of the arms 180 and this only occurs when the trip rods 175 are in their extreme downward position, which is never assumed except when any one of the punches 110, 144 or 146 are permitted to do so by the failure of either a jacket, pyramid or slug to be placed thereunder. If any one of these elements are in their proper position, the sleeve 172 will move in the gate 4 to its upper position, and when the gate is in its extreme downward position the point of the screw 179 cannot contact with the arms 180, but, if perchance, any one of the above members or elements is not in the path of the punch, the sleeve 172 is not moved in the gate 4 and the screw 179 is brought in contact with the arms 180, causing the shaft 181 to rock and the mechanism to come to a full stop. It is apparent, therefore, that unless the jacket, pyramid and slug are all inserted properly, the mechanism will stop and no damage can be done to any of the parts, nor will the operations continue without the delivery of all three members.

There are minor changes and alterations that can be made within my invention, and I would therefore have it understood, that I do not limit myself to the exact construction herein shown and described, but claim all that falls fairly within the spirit and scope of my invention as defined by the appended claims.

Having described my invention, what I claim as new, and desire to secure by Letters Patent, is:—

1. In a device of the character described, the combination with means for automatically feeding and transferring successively and progressively to a plurality of dies and assembling three elements, two of which are within the third, and all combined to make a unitary structure.

2. In a device of the character described, the combination with means for automatically feeding and transferring successively and progressively to a plurality of dies and assembling three elements, two of which are within the third, and all combined to make a unitary structure, and means for presenting one of said elements with its heavier end uppermost.

3. In a device of the character described, the combination with means for automatically feeding and transferring successively and progressively to a plurality of dies and assembling three elements, which combine to form a unitary structure, and means for presenting each element in a uniform relative position.

4. In a device of the character described, the combination with means for automatically feeding and transferring successively and progressively to a plurality of dies and assembling three elements, two of which are within the third, and all combined to make a unitary structure; and means for changing or altering the shape of one of said elements before the other elements are assembled therewith.

5. In a device of the character described, the combination with means for automatically feeding and transferring successively and progressively to a plurality of dies and assembling three elements, two of which are within the third, and all combined to make a unitary structure; means for changing or altering the shape of one of said elements before the other elements are assembled therewith; and means for shaping said first element, after the other elements are assembled therewith, so that the other elements cannot be disengaged therefrom.

6. In a device of the character described, the combination with means for successively presenting and transferring to a series of dies a plurality of elements and assembling them into a unitary structure; and means for automatically stopping the movement of all of said elements if the same are not successively presented in the predetermined manner and position.

7. In a device of the character described, the combination with means for automatically feeding and transferring to a series of dies a plurality of elements and assembling them into a unitary structure; and means for automatically stopping the feeding of all of said elements if any one of the same is not presented in its predetermined position and relation.

8. In a machine of the character described having a plurality of dies and registering punches for assembling into a unitary structure a plurality of independent elements; of a hopper for each of said elements; means connected therewith whereby said elements are delivered in their proper order and position to their respective dies successively; means for automatically transferring the first of said elements to one die whereby the second of said elements may be inserted therein; means for transferring both of said elements, when so assembled, to another die whereby the third of said elements may be inserted therein; mechanism for performing operations upon said elements; and means for stopping the operation of all of said mechanisms if any of said elements are not properly presented.

9. In a machine of the character described, a series of dies and a series of punches constantly registering with said dies, the combination with a gate supporting said punches; of a rotary shaft; means for rotating said shaft through a clutch or similar mechanism; means for operatively connecting said gate and shaft; a rock shaft; means for operating said rock shaft from said gate; and mechanism between said rock shaft and clutch mechanism, whereby the movement of said shaft will initiate movement of said clutch mechanism.

10. In a machine of the character described, a series of dies and a series of punches constantly registering with said dies, the combination with a gate supporting said punches; of a shaft; means for rotating said shaft; clutch or similar mechanism, forming a make and break connection between said shaft and rotating means; means for operatively connecting said gate and shaft; a plurality of said punches yieldingly mounted in said gate; a rock shaft; mechanism between said rock shaft and clutch mechanism, whereby the latter may be operated; and means connected with said gate for operating said rock shaft.

11. In a machine of the character described, a series of dies and a series of punches constantly registering with said dies, the combination with a gate supporting said punches; of a shaft; means for rotating said shaft; clutch or similar mechanism, forming a make and break connection between said shaft and rotating means; means for operatively connecting said gate and shaft; one or more of said punches yieldingly mounted in said gate; a rock shaft; mechanism between said rock shaft and clutch mechanism, whereby the latter may be operated; and means associated with said yielding punch or punches for operating said rock shaft.

12. In a machine of the character described, a series of dies and a series of punches constantly registering with said dies, certain of said punches being yieldingly mounted; the combination with a gate supporting said punches, of a shaft, means for rotating said shaft, a clutch or similar mechanism forming a make and break connection between said shaft and rotating mechanism, means for operatively connecting said gate and shaft, a rock shaft; and mechanism between said rock shaft and clutch mechanism and one of said yieldingly mounted punches whereby said clutch mechanism may be released.

13. In a machine of the character described, a series of dies and a series of punches constantly registering with said dies, the combination with a gate supporting said punches; of a shaft; means for rotating said shaft; clutch or similar mechanism, forming a make and break connection between said shaft and rotating mechanism; means for operatively connecting said gate and shaft; a rock shaft; mechanism between said rock shaft and clutch mechanism whereby the latter may be operated; and some of said punches being yieldingly supported by said gate; and means connected with said yieldingly mounted punches for operating said rock shaft.

14. In a machine of the character described, a series of dies and a series of punches constantly registering together, one or more of said punches having a yielding support and automatically operating stop mechanism associated with such yielding punch or punches, said mechanism comprising a trip member, and means operatively associated therewith for operating said trip member at predetermined times.

15. In combination with a rotary shaft; a driving member loosely mounted thereon; a make and break connection member between said shaft and driving member, whereby movement is imparted to said shaft from said driving member; a reciprocating gate; a connection between said gate and shaft; an actuating member for moving said make and break connection member in one direction; lever means for moving said actuating member in one direction; spring means for moving the same in the opposite direction; means for holding said lever means in such position that said actuating member will be held out of the path of the make and break connection member; a punch yieldingly connected with said gate; a rock shaft; means connected with said punch, whereby in one of its positions it will impart movement to said rock shaft; and means, actuated by said rock shaft for moving said lever means so that it may be actuated by said spring means, the said make and break connection member being actuated in one direction as a result thereof.

16. In a device of the character described, the combination with a reciprocating gate; of a plurality of punches connected therewith, some of said punches being rigidly connected with said gate and others yieldingly connected therewith; a plurality of stationary dies permanently registering with said punches, a plurality of hoppers for holding blanks; means for connecting said hoppers with said dies; means for delivering blanks from each of said hoppers to said dies in their proper order and relative position; means for transferring said blanks one at a time from one of said dies to another die in line with said punches; and means for stopping the movement of said gate through mechanism actuated from one or more of said punches if said blanks are not delivered or are not in line with said punches.

17. In a machine for forming and assembling an article composed of a number of parts, a plurality of punches and corresponding dies, means for feeding a blank first to a forming die and subsequently progressively transferring the blank or partly finished article from one die to another die introducing the several parts of the article at different stages of the operation and finally ejecting the finished article.

18. In a machine of the character described, a series of punches and registering dies successively and progressively operating to assemble an article composed of a number of parts, a number of said punches corresponding with the number of said parts having a yielding support and which yielding punch or punches upon failure or irregularity in the feeding of a part of said article operate releasing mechanism associated therewith which mechanism automatically stops the machine.

19. In a machine of the character described, a series of dies and a series of punches constantly registering together, one or more of said punches having a yielding support, and automatically operating stop mechanism associated with such yielding punch or punches.

20. In a machine for assembling an article composed of a plurality of parts, a series of dies supported by a stationary member, a series of punches permanently registering with said dies, mechanism for feeding said parts at various stages of the operation of the machine, mechanism for transferring the partly finished article in succession from one die to another, and mechanism released by a certain punch or punches of said series of punches for automatically stopping the machine upon any irregularity occurring in the feed of said feeding mechanism.

21. In a machine of the character described, a series of dies and a series of punches which register therewith, certain of said punches being yieldingly mounted; the combination with a gate supporting said punches, of a shaft, means for rotating said shaft, a make and break mechanism forming a connection between said shaft and rotating means, means for operatively connecting said gate and shaft, a rock shaft; and mechanism between said rock shaft, said make and break mechanism, and one of said yieldingly mounted punches whereby said make and break mechanism may be released.

In testimony whereof I have hereunto affixed my signature.

RICHARD LESTER WILCOX.